US012710050B2

(12) United States Patent
Kopecky et al.

(10) Patent No.: US 12,710,050 B2
(45) Date of Patent: Aug. 18, 2026

(54) STATIC GAS THRUST BEARING

(71) Applicant: Garrett Transportation I Inc., Torrance, CA (US)

(72) Inventors: Matej Kopecky, Brno (CZ); Epaphroditus Raja Sekhar Nicodemus, Brno (CZ)

(73) Assignee: Garrett Transportation I Inc., Torrance, CA (US)

(*) Notice: Subject to any disclaimer, the term of this patent is extended or adjusted under 35 U.S.C. 154(b) by 62 days.

(21) Appl. No.: 18/613,482

(22) Filed: Mar. 22, 2024

(65) Prior Publication Data

US 2025/0297614 A1 Sep. 25, 2025

(51) Int. Cl.

| | |
|---|---|
| ***F04D 29/051*** | (2006.01) |
| ***F04D 17/12*** | (2006.01) |
| ***F04D 25/06*** | (2006.01) |
| ***F04D 25/16*** | (2006.01) |
| ***F16C 32/06*** | (2006.01) |

(52) U.S. Cl.

CPC ......... *F04D 29/0513* (2013.01); *F04D 17/12* (2013.01); *F04D 25/06* (2013.01); *F04D 25/16* (2013.01); *F16C 32/0603* (2013.01); *F16C 2360/44* (2013.01)

(58) Field of Classification Search

CPC .... F04D 17/12; F04D 17/122; F04D 19/0513; F04D 25/16; F04D 29/0513; F04D 29/057; F16C 2360/44; F25B 31/006

See application file for complete search history.

(56) References Cited

U.S. PATENT DOCUMENTS

2020/0291953 A1 9/2020 Perevozchikov et al.
2022/0403850 A1* 12/2022 Zhang ................ F04D 25/0606
2023/0304706 A1 9/2023 Moon et al.

FOREIGN PATENT DOCUMENTS

DE 102022203573 A1 * 10/2023 .......... F04D 17/122
EP 4112941 A1 1/2023

OTHER PUBLICATIONS

Rink et al., Method for Operating a Multi-Stage Compressor . . . , Mach Trans. DE 10202203573, (Year: 2023).*

* cited by examiner

*Primary Examiner* — Kenneth J Hansen
(74) *Attorney, Agent, or Firm* — BelayIP

(57) ABSTRACT

A two stage centrifugal compressor including a first impeller and a second impeller rigidly coupled via a rotational shaft, an electric motor for driving the rotational shaft, the first impeller configured to compress a low pressure fluid to generate a pressurized fluid, a first fluid flow channel to couple a first portion of the pressurized fluid to a first static gas thrust bearing for supporting the first impeller, a second fluid flow channel to couple a second portion of the pressurized fluid to the second impeller, the second impeller configured to compress the pressurized fluid to generate a high pressure fluid, a third fluid flow channel to couple a first portion of the high pressure fluid to a second static gas thrust bearing for supporting the second impeller, and a second fluid flow channel to couple a second portion of the pressurized fluid to an output.

8 Claims, 5 Drawing Sheets

STATIC GAS THRUST BEARING

TECHNICAL FIELD

The present disclosure generally relates to a bearing system for use with centrifugal compressors, and more particularly, relates to the use of static gas thrust bearings in a two-stage centrifugal compressor wherein each stage of the centrifugal compressor pressurizes a fluid to be used as a thin film within the static gas thrust bearing.

BACKGROUND

Turbochargers spin at incredibly high speeds, often exceeding 100,000 revolutions per minute (RPM). These high speeds generate immense centrifugal forces that create significant stress on the shaft and bearing system. Bearings are crucial to handle these extreme loads and maintain smooth, vibration-free operation and play a vital role in ensuring the smooth, efficient, and reliable operation of turbochargers. Their importance lies in their ability to handle extreme speeds, loads, and temperatures while minimizing friction and maintaining shaft alignment. Improved bearing performance and ensuring minimization of friction between parts of the bearing can maximize turbocharger performance and longevity. Reliable bearings significantly contribute to the overall lifespan and dependability of the turbocharger, ensuring consistent performance and engine protection Air bearings offer several advantages over traditional rolling element bearings for use in compressors. Air bearings experience near-zero friction due to the air film separating the shaft and bearing surface. This reduces energy losses, heat generation, and wear, leading to smoother operation, longer bearing life, and improved efficiency. However, air bearings generally have lower load-carrying capacity compared to rolling element bearings which traditionally has limited their use in high-pressure or heavy-duty compressor applications. Air bearings tend to be less stiff than traditional bearings, making them more susceptible to external vibrations and deformations, affecting the stability and accuracy of the compressor shaft. Additionally, some air bearing types, like aerodynamic bearings, may experience wear during startup and shutdown due to the lack of an air film at low speeds. It would be desirable to overcome these problems associated with air bearings in order to take advantage of the benefits of air bearings for compressor systems. Other desirable features and characteristics of the present disclosure will become apparent from the subsequent detailed description and the appended claims, taken in conjunction with the accompanying drawings and this background discussion.

The above information disclosed in this background section is only for enhancement of understanding of the background of the invention and therefore it may contain information that does not form the prior art that is already known in this country to a person of ordinary skill in the art.

BRIEF SUMMARY

Disclosed herein are fluid compression and motor control methods and systems and related electrical systems for provisioning such systems, methods for making and methods for operating such systems, and motor vehicles and other equipment such as aircraft, ships, wind turbines and other electric vehicles equipped with onboard propulsion systems. By way of example, and not limitation, there are presented various embodiments of systems for providing a static gas thrust bearing in a centrifugal compressor.

In accordance with an exemplary embodiment, a centrifugal compressor including an input configured to receive a low pressure fluid, a first compressor for receiving the low pressure fluid from the input, for compressing the low pressure fluid to generate a pressurized fluid and for coupling a first portion of the pressurized fluid to a first output and a second portion of the pressurized fluid to a first thrust bearing intake, a first thrust bearing including a first bearing plate rigidly affixed to a compressor housing and a first bearing runner rigidly affixed to a first rotational shaft of the first compressor, wherein the first bearing plate includes a first plurality of feeding holes for coupling the second portion of the pressurized fluid from the first thrust bearing intake to a first interface between the first bearing plate and the first bearing runner such that the first bearing plate and the first bearing runner are separated by the second portion of the pressurized fluid during a rotation of the first compressor, a second compressor for receiving the first portion of the pressurized fluid, for compressing the pressurized fluid to generate a high pressure fluid and for coupling a first portion of the high pressure fluid to a second output and a second portion of the high pressure fluid to a second thrust bearing intake and a second thrust bearing including a second bearing plate rigidly affixed to the compressor housing and a second bearing runner rigidly affixed to a second rotational shaft of the second compressor, wherein the second bearing plate includes a second plurality of feeding holes for coupling the second portion of the high pressure fluid from the second thrust bearing intake to a second interface between the second bearing plate and the second bearing runner such that the second bearing plate and the second bearing runner are separated by the second portion of the high pressure fluid during a rotation of the second compressor.

In accordance with another exemplary embodiment of the present disclosure, a method of operating a centrifugal compressor including receiving, at a first compressor input, a low pressure fluid from an evaporator, compressing the low pressure fluid with a first centrifugal compressor to generate a pressurized fluid, coupling a first portion of the pressurized fluid to a first compressor output and a second portion of the pressurized fluid to a first thrust bearing intake, and coupling the second portion of the pressurized fluid from the first thrust bearing intake to a first interface between a first bearing plate and a first bearing runner such that the first bearing plate and the first bearing runner are separated by the second portion of the pressurized fluid during a rotation of a first compressor impeller.

In accordance with another exemplary embodiment of the present disclosure, a two stage centrifugal compressor including an input configured to receive a low pressure fluid, a first impeller and a second impeller rigidly coupled via a rotational shaft, an electric motor for driving the rotational shaft, the first impeller configured to compress the low pressure fluid to generate a pressurized fluid, a first fluid flow channel to couple a first portion of the pressurized fluid to a first static gas thrust bearing for supporting the first impeller, a second fluid flow channel to couple a second portion of the pressurized fluid to the second impeller, the second impeller configured to compress the pressurized fluid to generate a high pressure fluid, a third fluid flow channel to couple a first portion of the high pressure fluid to a second static gas thrust bearing for supporting the second impeller, and a fourth fluid flow channel to couple a second portion of the pressurized fluid to an output.

The above advantage and other advantages and features of the present disclosure will be apparent from the following detailed description of the preferred embodiments when taken in connection with the accompanying drawings.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
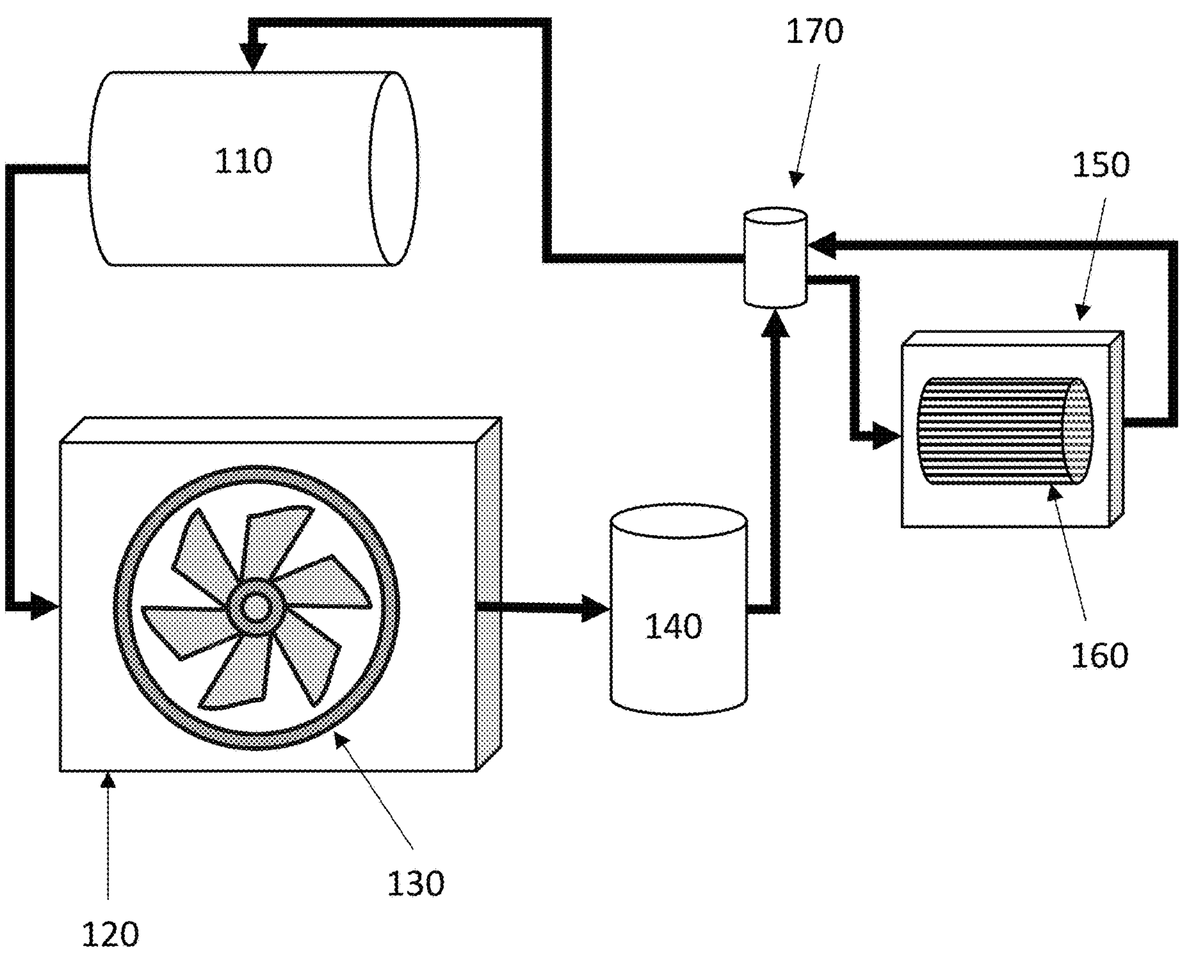
FIG. 1 illustrates an exemplary environment for application of a two-stage centrifugal compressor with static gas thrust bearings according to exemplary embodiments of the present disclosure.

Turning now to FIG. 1, an exemplary environment 100 for application of a two-stage centrifugal compressor with static gas thrust bearings according to exemplary embodiments of the present disclosure is shown. The exemplary environment 100 can be an automotive air conditioning system including a compressor 110, a condenser 120, a condenser fan 130, a refrigerant drier 140, an evaporator 150, an evaporator fan 160, and an expansion valve 170.

The compressor 110 in the exemplary automotive air conditioning system is a device used to compress a refrigerant gas. In some exemplary embodiments, the compressor 110 can be a centrifugal compressor using an electric motor to drive one or more impellers to increase a pressure of an incoming refrigerant and direct this high velocity refrigerant into a diffuser. The diffuser works to increase the pressure of the refrigerant. As the pressure of the refrigerant increases, so does the temperature of the refrigerant. This high-pressure, high temperature, refrigerant is then coupled from the compressor 110 to the condenser 120.

The condenser 120 is a heat exchanger configured to transfer heat from the high pressure, high temperature refrigerant to the ambient environment. The refrigerant is channeled through a number of thermally conductive tubes equipped with external thermally conductive fins. Air, or another coolant, can be forced through the condenser and across the thermally conductive tubes and fins, in part by the co-located condenser fan 130, to aid in the transfer of the thermal energy from the refrigerant to the flowing air. This heat exchange condenses the refrigerant back into a liquid, significantly reducing its temperature. This liquid refrigerant is then coupled to a refrigerant dryer 140.

The refrigerant dryer 140 is configured to filter out moisture and other contaminants in the air conditioning system. The refrigerant dryer 140 typically includes a desiccant dehumidifier, such as silica gel beads, to absorb moisture that has infiltrated the air conditioning system. In addition, the refrigerant dryer 140 can include a filter to trap debris and an oil separator for removing excess compressor oil from the refrigerant. After filtering by the refrigerant dryer 140, the high pressure liquid refrigerant is coupled to the expansion valve 170.

The expansion valve 170 is configured to transition the high pressure liquid refrigerant to a lower pressure gas by regulating the flow of the high pressure refrigerant into the evaporator 150 and to prevent any sudden drop in pressure of the refrigerant to ensure that the refrigerant does not reach other components, such as the compressor 110, in a liquid state. The compressed and cooled liquid refrigerant undergoes a controlled pressure drop through the expansion valve 170, causing partial evaporation and a significant absorption of heat from the surrounding air in the evaporator 170. The expansion valve 170 can be an electronically controlled expansion valve (EEV) which uses electronic sensors to detect the heat and pressure of the refrigerant in order to efficiently manage refrigerant flow. Alternatively, the expansion value can be a thermostatic expansion valve (TEC) which uses a sensor bulb to monitor the temperature of the refrigerant and to regulate the refrigerant flow accordingly.

The cold, low pressure refrigerant is then coupled to an evaporator 150. The evaporator 150 is a heat exchanger consisting of a network of thermally conductive tubes and fins. In an automotive air conditioning system, the evaporator 150 is typically located within a vehicle cabin and is installed with an evaporator fan 160 for forcing air through the thermally conductive tubes and fins which extract heat from this airflow. The cooled airflow is then distributed through the vehicle cabin. The low-pressure refrigerant absorbs heat from the forced air as it travels through the evaporator 150 and is then coupled back to the compressor 110 via the expansion valve 170 and re-enters the compressor 110 completing the cycle. The heat load and pressure of the refrigerant from the evaporator 150 is used to regulate the expansion valve 170 to control the pressure drop of the liquid refrigerant to the evaporator 150.

Figure 2:
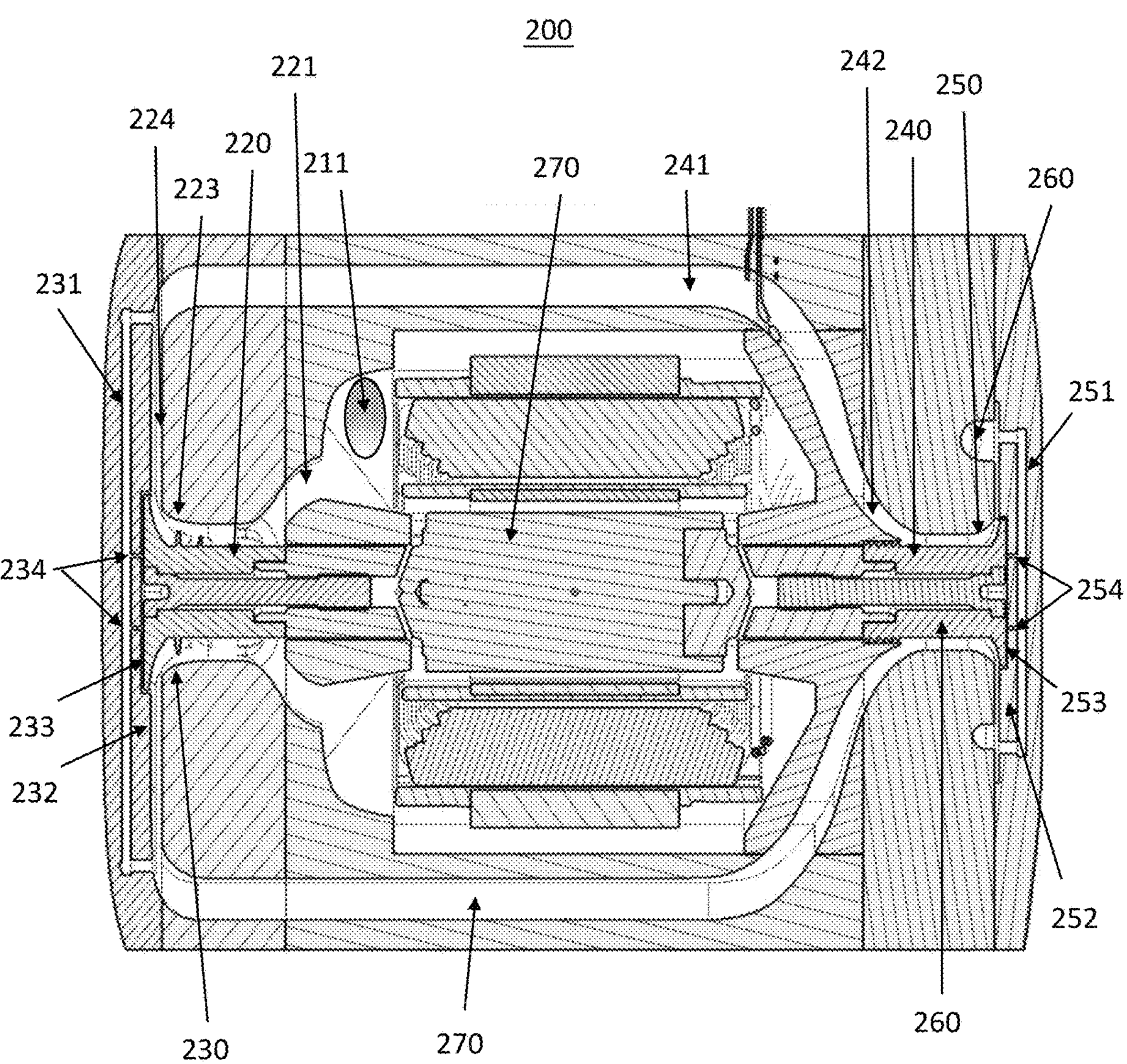
FIG. 2 shows an exemplary cross sectional view of a two-stage centrifugal compressor having a plurality of static gas thrust bearings according to exemplary embodiments of the present disclosure.

Referring now to FIG. 2, an exemplary two stage centrifugal compressor 200 with static gas thrust bearings according to exemplary embodiments of the present disclosure is shown. The exemplary compressor 200 includes an inlet 211, a first impeller 220, a first diffuser 230, a second impeller 240, a second diffuser 250, and an electric motor 270. In some exemplary embodiments, the first impeller 220 and the second impeller 240 of the two-stage centrifugal compressor 200 can be driven by an integrated electric motor 270.

A two-stage centrifugal compressor 200 is employed in many industrial and commercial applications where high-pressure gas flow is required. The compressor achieves this high-pressure gas flow by progressively increasing the pressure of the gas in two distinct stages. Compared to a single-stage design, a two-stage compressor 200 can achieve significantly higher pressure ratios for the final discharge gas as pressure rise is achieved incrementally, reducing the risk of aerodynamic inefficiencies like shock waves. In some exemplary embodiments, the compressor 200 can include an interstage cooler positioned between the two stages to reduce the gas temperature after the first stage compression, improving overall efficiency by allowing more compression in the second stage without exceeding temperature limits. Interstage cooling allows for denser packing of gas molecules after the first stage, enabling more compression in the second stage without excessive temperature rise leading to higher overall compressor efficiency.

In some exemplary embodiments, the two-stage centrifugal compressor 220 for use in an automotive air conditioning system is configured to first receive, at the inlet 210, a low pressure refrigerant from the evaporator stage via the expansion valve. While the current embodiment is described in terms of compression a refrigerant, any gas, coolant or compressible fluid can be employed depending on design requirements and system characteristics. The low pressure fluid can be coupled from the inlet 211 to the first stage of the two stage compressor 200. In some exemplary embodiments, the inlet 211 can be positioned such that the low pressure refrigerant flow is directed through the electric motor 270, thereby cooling the electric motor during operation.

The lower pressure coolant is coupled from the inlet 211 to the first impeller 220 via the first stage nozzle 221. The first impeller 220 is rotated by the electric motor 270. The first stage of the compressor 200 utilizes the blades of the rotating first impeller 220 to impart kinetic energy to a low pressure coolant. As the low pressure coolant enters the first stage axially through an nozzle 221, the low pressure coolant is accelerated outward by the first impeller 220. The first diffuser 230 then converts the high velocity of the coolant into increased pressure as it flows radially outward to the first volute 224. This pressure increase of the coolant is achieved by progressively expanding the flow path and slowing the gas down.

The pressurized coolant from the first volute 224 is split between a second stage input 241 and a first thrust bearing input 231. In some exemplary embodiments, the percentage of coolant flow directed between the second stage input 241 and the first thrust bearing input 231 is regulated by the respective cross sectional areas of the coolant flow channels. The first gas thrust bearing receives the pressurized coolant via the first thrust bearing input 231 and couples this pressurized coolant through the first bearing plate 232 to the first bearing runner 233 through a plurality of feeding holes 234. The first gas thrust bearing 232 utilizes pressurized coolant to create a thin film between the first bearing plate 232 and first bearing runner 233, enabling frictionless relative axial motion. The plurality of feeding holes 234 are uniformly distributed in the first bearing plate 232 to create a pressure distribution on the first bearing runner 233 that resists the thrust load and separates the bearing surfaces to prevent contact and minimizes friction and wear. After flowing between the first bearing plate 232 and first bearing runner 233, the pressurized coolant flows into the first volute 224.

A portion of the pressurized coolant, determined in response to the cross sectional areas of the first thrust bearing input 231 and the second stage input 241, is next coupled to the second stage nozzle 242 via the second stage input 241. The pressurized coolant is further pressurized by the second impeller 240 and the second diffuser 250 resulting in a high pressure coolant. The high pressure coolant is the coupled to the output 260 and a second thrust bearing input 251. In some exemplary embodiments, the percentage of the high pressure coolant flow directed between the second thrust bearing input 251 and the output 260 is regulated by the respective cross sectional areas of the coolant flow channels. The second stage thrust bearing receives the high pressure coolant via the second thrust bearing input 251 and couples this high pressure coolant through the second bearing plate 252 to the first bearing runner 253 through a plurality of feeding holes 234. The second gas thrust bearing utilizes the high pressure coolant to create a thin film between the first bearing plate 252 and first bearing runner 233, enabling frictionless relative axial motion.

Figure 3:
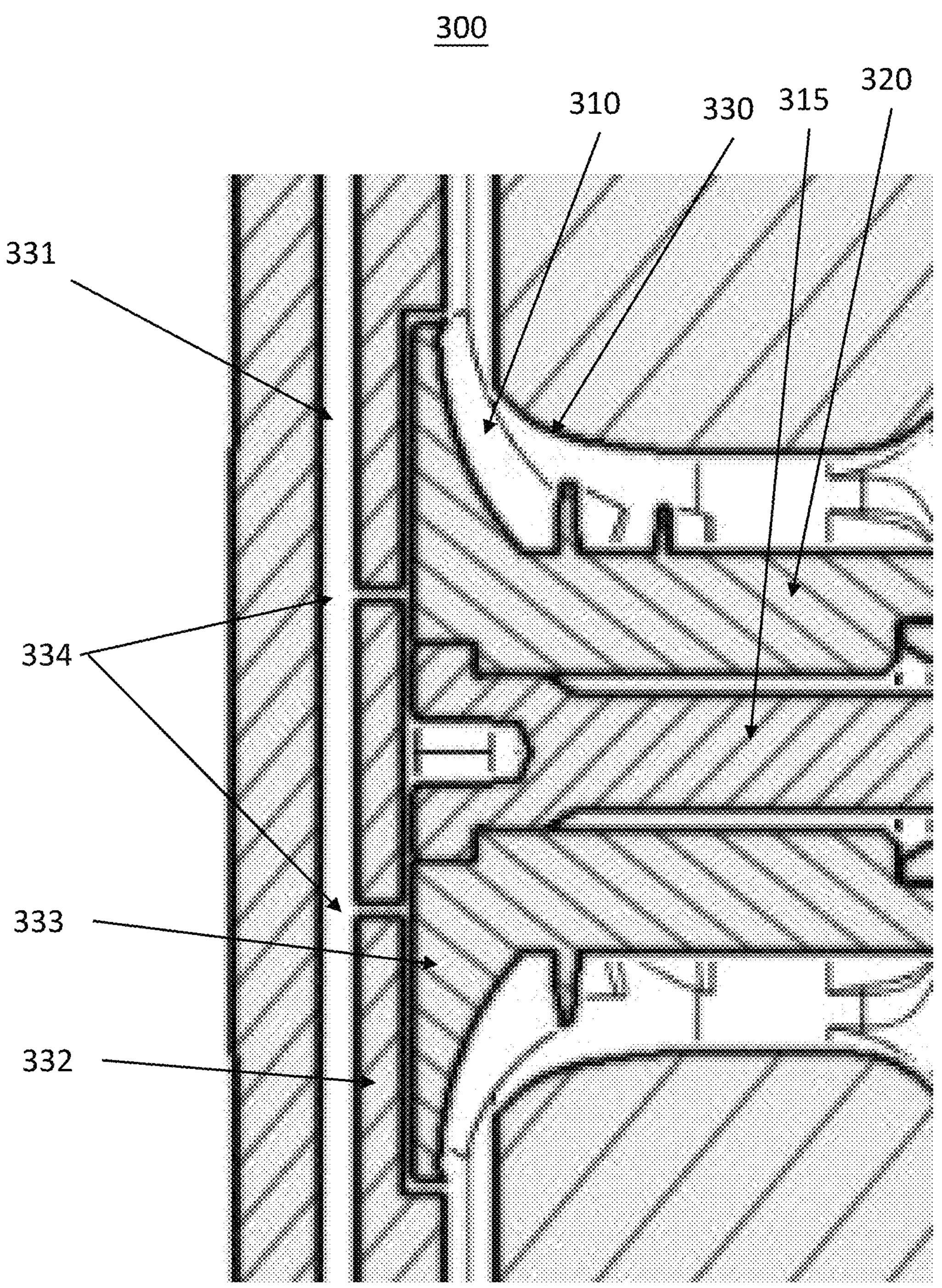
FIG. 3 shows an exemplary cross sectional view of a static gas thrust bearing in a centrifugal compressor to an exemplary embodiments of the present disclosure.

In some exemplary embodiments, during a startup phase of the two stage centrifugal compressor 200, the low pressure coolant can be pressured by an external pressure source (not shown) such that the first gas thrust bearing and the second gas thrust bearing are pre-pressurized to reduce metal to metal contact and wear and tear during startup of the compressor 200. In some exemplary embodiments, the plurality of feeding holes 234 and 254 need not be limited to circular shape but can be of any shape which include square/rectangular slots, elliptical holes, . . . etc and can supplies the refrigerant flow to carry the load and separate the surfaces Turning now to FIG. 3, a view of an exemplary static gas thrust bearing 300 according to exemplary embodiments of the present disclosure is shown. The view is illustrative of the gas thrust bearing input 331, the plurality of feeding holes 334, the bearing plate 332 and the bearing runner 233. The view is further illustrative of the volute 310, rotational shaft 315, impeller 320 and diffuser 330 of the centrifugal compressor.

In some exemplary embodiments, the rotational shaft 320 is rotated by an electric motor (270 of FIG. 2). Low pressure coolant is accelerated outward by the impeller 320. The first diffuser 330 then converts the high velocity of the coolant into increased pressure as it flows radially outward to the first volute 310. A portion of the pressurized coolant is routed, via the thrust bearing input 231, to a plurality of feeding holes 334 in the bearing plate 332. This pressurized coolant is then coupled into a junction of the bearing plate 332, which is stationary, and the bearing runner 333 which rotates with the impeller 320 driven which is rigidly affixed to the rotational shaft 315. The pressurized coolant acts as a thin film separating the bearing runner 333 and the bearing plate 332. This pressurized gas film acts as a lubricant, enabling frictionless relative axial or radial motion. In some exemplary embodiments, channels or recesses within the bearing plate 332 distribute the gas, creating a pressure differential that supports the applied load and prevents contact between the bearing runner 333 and the bearing plate 332, minimizing wear and friction for the high-speed centrifugal compressor application.

Figure 4:
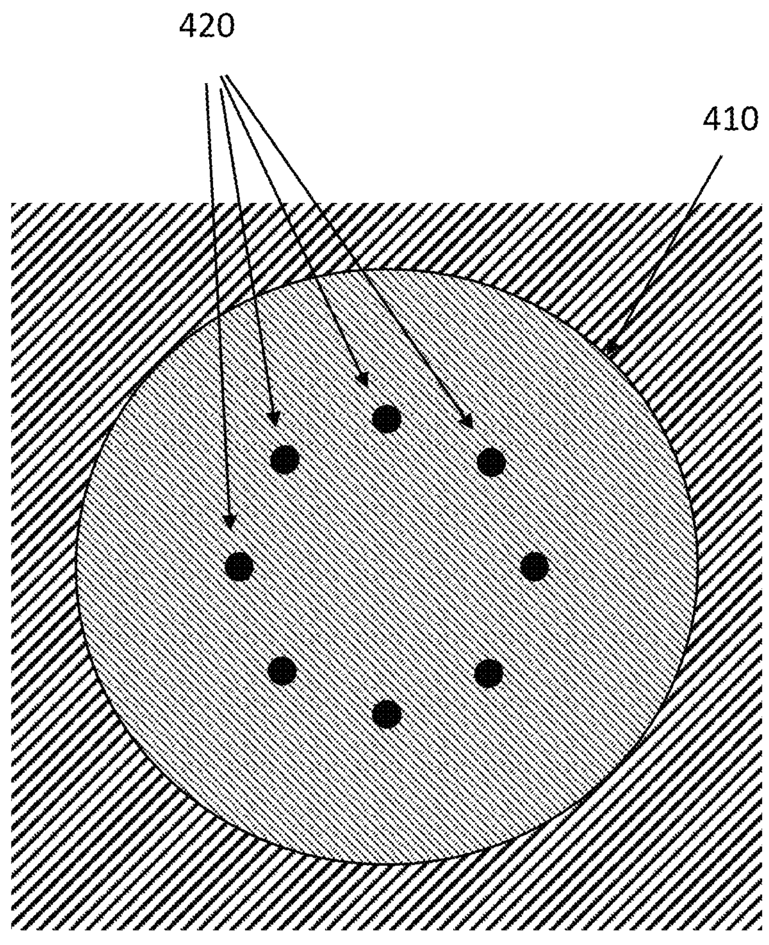
FIG. 4 shows a of an exemplary layout of a plurality of feeding holes in a gas thrust bearing plate for a static gas thrust bearing according to an exemplary embodiments of the present disclosure.

Turning now to FIG. 4, a view of an exemplary layout of a plurality of feeding holes in a gas thrust bearing plate for a static gas thrust bearing 400 according to exemplary embodiments of the present disclosure is shown. The view is illustrative of the gas thrust bearing plate 410 and the plurality of feeding holes 420. The plurality of feeding holes 420 are shown in a circular pattern through the bearing plate 410 to allow the pressurized coolant of flow from the thrust bearing input to be routed into the junction between the bearing runner and the bearing plate at various locations. In some exemplary embodiments, the locations of the feed holes can be altered such that a uniform pressure is applied to the entire junction between the bearing runner and the bearing plate.

Figure 5:
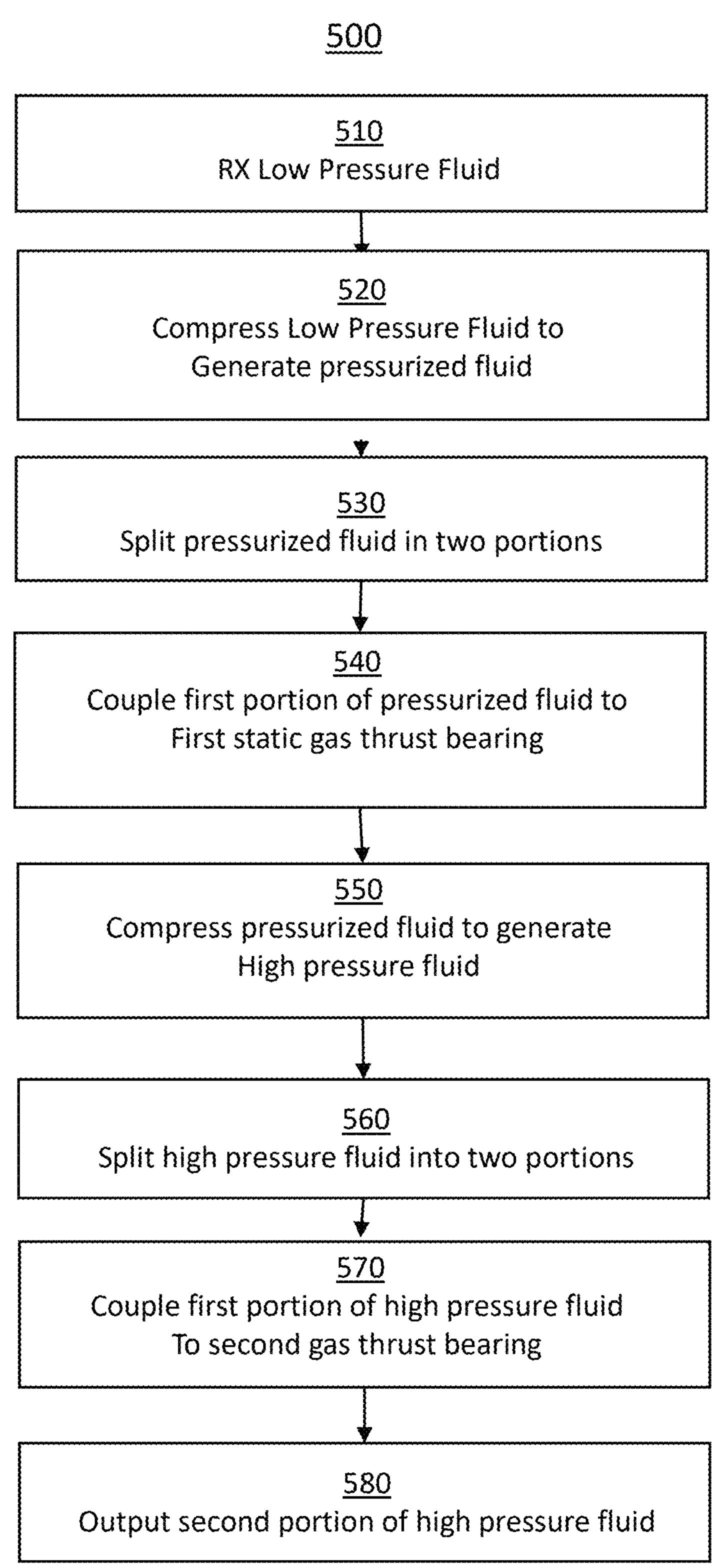
FIG. 5 illustrates an exemplary method for implementing a two stage compressor having static gas thrust bearings according to an exemplary embodiments of the present disclosure.

Turning now to FIG. 5, a flowchart illustrative of a method 500 for implementing a two stage compressor having static gas thrust bearings according to exemplary embodiments of the present disclosure is shown. The method 500 is first operative to receive 510, at a compressor input, a low pressure fluid. In some exemplary embodiments, the low pressure fluid can be a refrigerant or a coolant from an evaporator as part of a cooling system.

The method 500 is next operative for compressing the low pressure fluid with a first centrifugal compressor to generate a pressurized fluid. In some exemplary embodiments, the first compressor can be a first centrifugal compressor driven by an electric motor. The first centrifugal compressor can include a first impeller and a first diffuser for accelerating the low pressure fluid into a first volute. The first volute can then restrict the flow of the low pressure fluid, resulting in a pressurized fluid.

The method 500 is next operative for splitting 530 the pressurized fluid into a first portion and a second portion. The first portion of the pressurized fluid is then coupled 540 to a first thrust bearing intake. This first portion of the pressurized fluid is then coupled to an interface of a first thrust bearing plate and a first bearing runner such that the first thrust bearing plate and the first thrust bearing runner are separated by the second portion of the pressurized fluid during a rotation of the first compressor. The first portion of the pressurized fluid forms a thin film of gas between the first thrust bearing plate and a first thrust bearing runner to separate them and minimize friction. This thin film is created by the pressurization of the fluid and the relative motion of the first thrust bearing plate and a first thrust bearing runner. In some exemplary embodiments, the first thrust bearing plate is rigidly coupled to a stationary compressor housing and the first thrust bearing runner is rigidly coupled to the first impeller which rotate within the compressor housing.

The method 500 next couples a second portion of the pressurized fluid to from a first compressor output to a second compressor input. The second compressor is then configured to compress 550 the pressurized fluid to a high pressure fluid. This second compressor can be a second centrifugal compressor having a second impeller and a second diffuser. In some exemplary embodiments, the first centrifugal compressor and the second centrifugal compressor can be mechanically coupled to a common rotational shaft wherein the common rotational shaft is driven by an electric motor. The first centrifugal compressor, the second centrifugal compressor and the electric motor can all be housed in a common compressor housing.

The method 500 is next operative for splitting 560 the high pressure fluid into a first portion and a second portion. The method 500 couples the first portion of the high pressure fluid to a second thrust bearing intake. The first portion of the high pressure fluid is then coupled 570 from the second thrust bearing intake to a second interface between a second bearing plate and a second bearing runner such that the second bearing plate and the second bearing runner are separated by the first portion of the high pressure fluid during a rotation of the second compressor.

The method 500 then couples 580 the second portion of the high pressure fluid to a second compressor output. In some exemplary embodiments, this second portion of the high pressure fluid can be coupled to a condenser in a vehicle cooling system. In some exemplary embodiments, the high pressure fluid can have a higher pressure than the pressurized fluid and wherein the pressurized fluid can have a higher pressure than the low pressure fluid. Likewise, the high pressure fluid, the pressurized fluid and the low pressure fluid can be a refrigerant in a gaseous state.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A centrifugal compressor comprising:

an input configured to receive a low pressure fluid;

a first compressor for receiving the low pressure fluid from the input, for compressing the low pressure fluid to generate a pressurized fluid and for coupling a first portion of the pressurized fluid to a first output and a second portion of the pressurized fluid to a first thrust bearing intake;

a first thrust bearing including a first bearing plate rigidly affixed to a compressor housing and a first bearing runner rigidly affixed to a first rotational shaft of the first compressor, wherein the first bearing plate includes a first plurality of feeding holes for coupling the second portion of the pressurized fluid from the first thrust bearing intake to a first interface between the first bearing plate and the first bearing runner such that the first bearing plate and the first bearing runner are separated by the second portion of the pressurized fluid during a rotation of the first compressor, and an electric motor for rotating the first rotational shaft of the first compressor to rotate a first impeller within the first compressor and wherein the low pressure fluid is routed from the input, through the electric motor to the first compressor.

2. The centrifugal compressor of claim 1 further including:

a second compressor for receiving the first portion of the pressurized fluid, for compressing the pressurized fluid to generate a high pressure fluid and for coupling a first portion of the high pressure fluid to a second output and a second portion of the high pressure fluid to a second thrust bearing intake; and a second thrust bearing including a second bearing plate rigidly affixed to the compressor housing and a second bearing runner rigidly affixed to a second rotational shaft of the second compressor, wherein the second bearing plate includes a second plurality of feeding holes for coupling the second portion of the high pressure fluid from the second thrust bearing intake to a second interface between the second bearing plate and the second bearing runner such that the second bearing plate and the second bearing runner are separated by the second portion of the high pressure fluid during a rotation of the second compressor.

3. The centrifugal compressor of claim 2 wherein the first rotational shaft and the second rotational shaft form a drive shaft rotated by an electric motor.

4. The centrifugal compressor of claim 1 wherein the electric motor is located within the compressor housing between the first compressor and a second compressor and wherein the rotational shaft of the first compressor rotates a second impeller of the second compressor.

5. The centrifugal compressor of claim 1 wherein the centrifugal compressor forms a portion of a cooling system and the low pressure fluid is a refrigerant received from an evaporator.

6. The centrifugal compressor of claim 1 wherein the plurality of feeding holes are configured in a pattern around an axis of rotation of the first rotational shaft and wherein each of the plurality of feeding holes has a cross sectional shape including at least one of a circular shape, a rectangular shape, an elliptical shape and a square shape.

7. The centrifugal compressor of claim 1 wherein a ratio of the first portion of the pressurized fluid and a second portion of the pressurized fluid is regulated in response to a cross sectional area of the first thrust bearing intake and a cross sectional area of the first output.

8. The centrifugal compressor of claim 1 wherein the first bearing plate is configured to support the first bearing runner during the rotation of the first compressor.

* * * * *